United States Patent [19]

Becker et al.

[11] 4,205,991

[45] Jun. 3, 1980

[54] TRANSFER PRINTING ON TEXTILE MATERIAL

[75] Inventors: Carl Becker, Basel; Jacques Wegmann, Bettingen; Raymond Defago, Riehen, all of Switzerland

[73] Assignee: Ciba-Geigy AG, Basel, Switzerland

[21] Appl. No.: 880,014

[22] Filed: Feb. 21, 1978

Related U.S. Application Data

[63] Continuation of Ser. No. 641,037, Dec. 15, 1975, abandoned.

[30] Foreign Application Priority Data

Dec. 13, 1974 [CH] Switzerland ................ 16610/74
Jan. 29, 1975 [CH] Switzerland ................ 1064/75

[51] Int. Cl.$^2$ ............................................. C09D 11/02
[52] U.S. Cl. ............................................. 106/22; 8/445; 260/29.3; 260/29.6 MN; 260/29.6 MQ
[58] Field of Search ............... 8/2.5 A, 2.5 R; 106/22; 260/29.6 MN, 29.6 MQ, 29.3

[56] References Cited

U.S. PATENT DOCUMENTS

| | | | |
|---|---|---|---|
| 3,702,752 | 11/1972 | Bent et al. | 8/2.5 A |
| 3,707,346 | 12/1972 | Markert et al. | 8/2.5 A |
| 3,891,581 | 6/1975 | Argenio | 260/16 |

FOREIGN PATENT DOCUMENTS

| | | |
|---|---|---|
| 1221126 | 2/1971 | United Kingdom . |
| 1243219 | 8/1971 | United Kingdom . |
| 1384546 | 2/1975 | United Kingdom . |
| 1404179 | 8/1975 | United Kingdom . |
| 1404180 | 8/1975 | United Kingdom . |
| 1429712 | 3/1976 | United Kingdom . |

*Primary Examiner*—Stanford M. Levin
*Attorney, Agent, or Firm*—Wenderoth, Lind & Ponack

[57] ABSTRACT

Transfer printing process on textile material is described with the use of a printing ink having an organic-aqueous base, which printing ink contains, in addition to at least one binding agent, at least one organic solvent and, optionally, water, an aqueous preparation of transferable dyestuffs or optical brighteners that are insoluble to difficultly soluble in water and have a particle size of less than 10μ, which preparation has a low content of dispersing agent and a high concentration of dyestuff or of optical brightener, characterized in that this preparation contains at least 10 percent by weight of water, at least 30 percent by weight of a finely dispersed transferable dyestuff or optical brightener insoluble to difficultly soluble in water, and a mixture consisting of at most 10 percent by weight of an anion-active dispersing agent, at most 5 percent by weight of a nonionic dispersing agent, and at most 35 percent by weight of a hydrotropic agent, as well as, optionally, further additives.

13 Claims, No Drawings

TRANSFER PRINTING ON TEXTILE MATERIAL

This application is a continuation of application Ser. No. 641,037, filed Dec. 15, 1975, (now abandoned).

The invention relates to the transfer printing on textile material with use of an organic-aqueous printing ink, to the organic-aqueous printing ink as such, as well as to the textile materials printed in the transfer printing process.

Printing inks having a purely organic or purely aqueous base as well as their use for the printing of carrier materials, particularly paper, and their use in the transfer printing process are known.

It has now been found that, surprisingly, also aqueous preparations can be used for the production of organic-aqueous printing inks, especially for gravure printing and flexographic printing, without disadvantageous effects, such as reagglomerations, occurring.

The invention relates thus to the transfer printing on textile material with the use of a printing ink having an organic-aqueous base, which printing ink contains, in addition to at least one binding agent, at least one organic solvent and, optionally, water, an aqueous preparation of transferable dyestuffs or optical brighteners that are insoluble to difficultly soluble in water and have a particle size of less than $10\mu$, especially less than $2\mu$, which preparation has a low content of dispersing agent and a high concentration of dyestuff or of optical brightener, with the said preparation containing at least 10 percent by weight, particularly 20 to 30 percent by weight, of water, at least 30 percent by weight, especially 35 to 65 percent by weight, preferably 40 to 60 percent by weight, of a finely dispersed transferable dyestuff or optical brightener insoluble to difficultly soluble in water, and a mixture consisting of at most 10 percent by weight, particularly 1 to 5 percent by weight, of an anion-active dispersing agent, at most 5 percent by weight, especially 1 to 3 percent by weight, of a nonionic dispersing agent, and at most 35 percent by weight, particularly 5 to 20 percent by weight, of a hydrotropic agent, as well as, optionally, further additives.

As transferable dyestuffs insoluble to difficultly soluble in water, such dyestuffs are used which, within the scope of this definition, are suitable for the transfer printing process, particularly disperse dyestuffs which are converted at atmospheric pressure at a temperature of between 150° and 220° C., to the extent of at least 60%, in less than 60 seconds into the vapour phase, which are stable on heating and which can be transferred without decomposing.

Such disperse dyestuffs that may be mentioned are, for example, monoazo dyestuffs of the formula

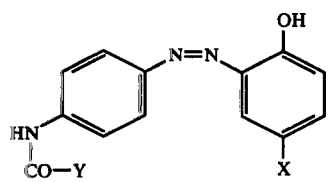

wherein

X and Y each represent an alkyl radical having 1 to 4 carbon atoms,

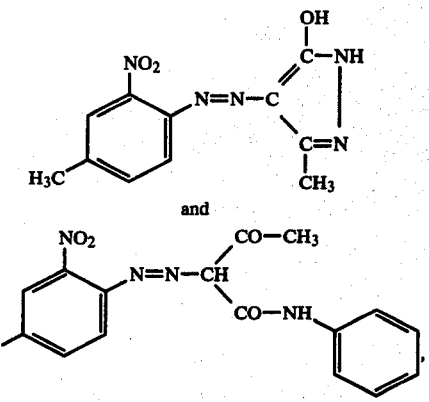

and, in particular, the quinophthalone dyestuff of the formula

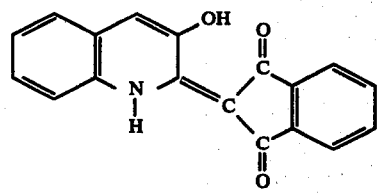

and the anthraquinone dyestuffs of the formulae

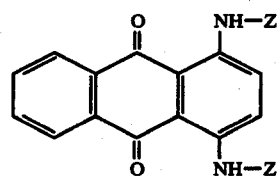

(Z=alkyl having 1 to 4 carbon atoms),

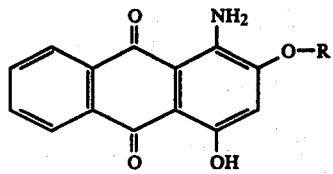

(R=alkyl or aryl)

($R_1$=alkyl having 3 to 4 carbon atoms),

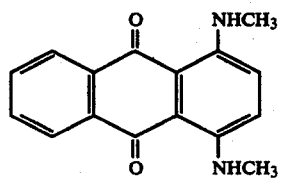

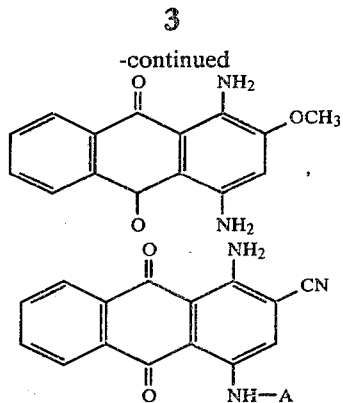

(A=alkyl or aryl), as well as brominated or chlorinated 1,5-diamino-4,8-dihydroxyanthraquinones.

Also of importance is the selection of dyestuffs in the case of dyestuff combinations, for only dyestuffs having similar transfer characteristics should be combined in the transfer process.

Furthermore, it is possible to use in the aqueous dyestuff preparations also mixtures of identical or different types of dyestuffs within the limits as defined, as well as transferable optical brighteners.

Suitable anion-active dispersing agents are, e.g.: sulphated primary or secondary, purely aliphatic alcohols of which the alkyl chain contains 8 to 18 carbon atoms, e.g. sodium lauryl sulphate, potassium-α-methyl stearyl sulphate, sodium tridecyl sulphate, sodium oleyl sulphate, potassium stearyl sulphate, or the sodium salts of coconut oil alcohol sulphates; sulphated unsaturated higher fatty acids or fatty acid esters, such as oleic acid, elaidic acid or ricinoleic acid, or lower alkyl esters thereof, e.g. ethyl ester, propyl ester or butyl ester, and the oils containing such fatty acids, such as olive oil, castor oil or rape oil; addition products of 1 to 20 moles of ethylene oxide with fatty amines, fatty acids or aliphatic alcohols having 8 to 20 carbon atoms in the alkyl chain, which addition products are converted into an acid ester by means of an organic dicarboxylic acid such as maleic acid, malonic acid or succinic acid, preferably however with an inorganic polybasic acid such as o-phosphoric acid or, in particular, sulphuric acid, for example such addition products with stearylamine, oleylamine, stearic acid, oleic acid, lauryl alcohol, myristyl alcohol, stearyl alcohol or oleyl alcohol, such as the ammonium salt of sulphated lauryl alcohol triglycol ether, or of 1 to 5 moles of ethylene oxide with alkylphenols, such as the acid sulphuric acid ester of the addition product of 2 moles of ethylene oxide with 1 mole of p-nonylphenol, the acid sulphuric acid ester of the addition product of 1.5 moles of ethylene oxide with 1 mole of p-tert.octylphenol, the acid sulphuric acid ester of the addition product of 5 moles of ethylene oxide with 1 mole of p-nonylphenol, the acid phosphoric acid ester of the addition product of 2 moles of ethylene oxide with 1 mole of p-nonylphenol, the acid maleic acid ester of the addition product of 2 moles of ethylene oxide with 1 mole of p-nonylphenol; sulphated esterified polyoxy compounds, for example sulphated, partially esterified polyvalent alcohols, such as the sodium salt of the sulphated monoglyceride of palmitic acid; instead of sulphates, it is also possible to use esters with other polyvalent mineral acids, e.g. phosphates; primary and secondary alkylsulphonates of which the alkyl chain contains 8 to 20 carbon atoms, e.g. ammonium decylsulphonate, sodium dodecylsulphonate, sodium hexadecanesulphonate and sodium stearylsulphonate; alkylarylsulphonates, such as alkylbenzenesulphonate having a straight-chain or branched-chain alkyl chain containing at least 7 carbon atoms, e.g. sodium dodecylbenzenesulphonate, 1,3,5,7-tetramethyloctylbenzenesulphonate, sodium octadecylbenzenesulphonate; such as alkylnaphthalenesulphonates, for example sodium-1-isopropylnaphthalene-2-sulphonate; sodium dibutylnaphthalenesulphonate; or such as dinaphthylmethanesulphonates, for example the disodium salt of di(6-sulphonaphthyl-2)-methane; sulphonates of polycarboxylic acid esters, for example sodium dioctylsulphosuccinate, sodium dihexylsulphophthalate; the sodium, potassium, ammonium, N-alkyl-, N-hydroxyalkyl-, N-alkoxyalkyl- or N-cyclohexylammonium or hydrazinium and morpholinium salts of fatty acids having 10 to 20 carbon atoms, which are designated as soaps, such as lauric, palmitic, stearic acid, or oleic acid of naphthenic acids, of resinic acids, such as abietic acid, e.g. the so-called rosin soap; esters of polyalcohols, particularly mono- or diglycerides of fatty acids having 12 to 18 carbon atoms, e.g. the monoglycerides of lauric, stearic, palmitic or oleic acid, as well as the fatty acid esters of sugar alcohols, such as sorbitol, sorbitans and saccharose, for example sorbitan-monolaurate (Span 20), sorbitan palmitate (Span 40), sorbitan stearate (Span 60), sorbitan oleate (Span 80), sorbitan sesquioleate, sorbitan trioleate (Span 85), or the oxyethylation products thereof (Tween).

Anion-active dispersing agents which have proved particularly favourable are condensation products of aromatic sulphonic acids with formaldehyde, such as condensation products from formaldehyde and naphthalenesulphonic acids, or from formaldehyde, naphthalenesulphonic acid and benzenesulphonic acid, or a condensation product from crude cresol, formaldehyde and naphthalenesulphonic acid, and lignin sulphonates and polyphosphates.

Normally, the anionic dispersing agents are in the form of their alkali salts, their ammonium salts or their water-soluble amine salts. It is advantageous to use qualities having a low content of foreign electrolytes. It is also possible to use mixtures of anionic dispersing agents.

Nonionic dispersing agents are, for example: addition products of, e.g., 5 to 50 moles of alkylene oxides, especially ethylene oxide (with some ethylene oxide units being able to be replaced by substituted epoxides such as styrene oxide and/or propylene oxide), with higher fatty acids, or with saturated or unsaturated alcohols, mercaptans or amines having 8 to 20 carbon atoms, or with alkylphenols or alkylthiophenols of which the alkyl radicals contain at least 7 carbon atoms; reaction products from higher-molecular fatty acids and hydroxyalkylamines; these can be prepared, for example, from higher-molecular fatty acids, preferably such ones having about 8 to 20 carbon atoms, e.g. caprylic acid, stearic acid, oleic acid and, in particular, from the mixture of acids embraced by the collective term "coconut oil fatty acid", and from hydroxyalkylamines such as triethanolamine or preferably diethanolamine, as well as from mixtures of these amines, with the reaction being so performed that the molecular quantity ratio between hydroxyalkylamine and fatty acid is greater than 1, for example 2:1. Such compounds are described in the U.S. Pat. No. 2,089,212; condensation products of alkylene oxide, especially ethylene oxide, with some ethylene oxide units being able to be replaced by substituted epoxides, such as styrene oxide and/or propylene oxide.

Fatty alcohol polyglycol ethers have proved particularly advantageous, especially those having more than 20 moles of ethylene oxide, such as cetyl-stearyl alcohol etherified with 25 moles of ethylene oxide, stearyl-oleyl alcohol etherified with 80 moles of ethylene oxide and oleyl alcohol etherified with 20 moles of ethylene oxide. Furthermore, phenol ethers such as p-nonylphenol etherified with 9 moles of ethylene oxide, ricinoleic acid ester having 15 moles of ethylene oxide and hydroabietyl alcohol etherified with 25 moles of ethylene oxide are also very suitable.

These nonionic dispersing agents advantageously have a low electrolyte content. Mixtures of such agents are possible and in some cases they have synergetic effects.

By hydrotropic agents used in the aqueous dyestuff preparations of the invention are meant those agents capable of converting the transferable dyestuffs or optical brighteners insoluble to difficultly soluble in water into an appreciably better soluble form, without-in the process-a chemical reaction occurring between the dyestuff or optical brightener and the hydrotropic substance. These compounds should be water-soluble. Suitable substances having these properties are, e.g., hydrotropic salts such as the sodium salt of benzoic acid, the sodium salt of benzenesulphonic acid, the sodium salt of p-toluenesulphonic acid or the sodium salt of N-benzylsulphanilic acid. Compounds which have proved particularly advantageous in this connection are, however, nitrogen-containing compounds, such as urea and derivatives thereof, for example dimethylurea or amides such as acetamide and propionamide.

By virtue of this combination of anion-active and nonionic dispersing agent with the hydrotropic agent, it is possible to obtain preparations which have on the one hand a low content of dispersing agent and on the other hand a high content of dyestuff, and which are characterised in particular by their stability both in the hot state and in the cold state in a temperature range of between about minus 10° C. and plus 60° C.; by their stability in storage over a period of several months; by free flowability; by their finely dispersed form; and, in particular, by their low viscosity in the range of about 1 to 1000 cP/20° C.

If desired or required, there can be added to these preparations further additives to improve properties, such as hygroscopic agents, e.g. glycols or sorbitols; antifrost agents, e.g. ethylene glycol or monopropylene glycol; antimicrobics; fungicides, e.g. aqueous formalin solution; antifoaming agents and agents improving viscosity, such as carboxymethylcellulose or silicic acid aerosil 300, which increase the viscosity of the printing ink and prevent sedimentation of the dyestuff or optical brightener.

By virtue of their high content of dyestuff and low content of dispersing agent and extenders, these preparations can be processed into low-viscous (about 20 to 700 cP/20° C., corresponding to approx. 15 to 200 seconds in the Ford viscosimeter-cup 4) organic-aqueous printing inks having an adequate concentration of dyestuff or optical brightener.

These organic-aqueous printing inks are produced by methods known per se, e.g. by diluting the aqueous preparations as defined in the organic solvent or solvent mixture, in the presence of a binding agent, optionally with a further addition of water, and stirring with intense turbulence.

Suitable organic solvents are, in particular: the first members of the straight-chain and branched chain aliphatic monovalent and bivalent alcohols, such as methanol, ethanol, n- and iso-propanol and ethylene glycol, or mixtures of such alcohols, such as a mixture of methanol and isopropanol, also mixtures of such alcohols with benzine having boiling limits between 110° and 180° C., in the ratio of $\geq 3:1$, with aliphatic ketones, such as a mixture of ethanol/methyl ethyl ketone and ethanol/methyl isobutyl ketone, or with nitroparaffins such as isopropanol/nitromethane. The range is advantageously limited to these solvents and mixtures thereof, because on the one hand they do not dissolve to intensively the transferable dyestuffs and optical brighteners concerned, and on the other hand they evaporate sufficiently rapidly. Furthermore, they must be able to be combined with a specific proportion of water without any gap in the range of miscibility. The following have proved particularly valuable: aliphatic alcohols such as methanol, ethanol, propanol, isopropanol, mixtures of such alcohols, such as methanol/isopropanol, or mixtures of such alcohols with benzine having a boiling range of 110° to 180° C., or with aliphatic ketones such as a mixture of ethanol/methyl ethyl ketone.

Effective binding agents used in these organic-aqueous printing inks should stabilise the dyestuff dispersion, should have little or no affinity to the dyestuffs, optical brighteners and solvents used, should merely retain these on the printed area of the inert carrier without modifying them, and should remain completely on the carrier material after the thermal transfer process. Preferred binding agents are those which are soluble in the mixture of water and organic solvent or in the mixture of organic solvents, and which rapidly and completely dry in, for example, a warm stream of air and form a fine film on the carrier material, and which are able to bind the dyestuff well, i.e. to render it fast to rubbing. Furthermore, it is important that the binding agents—or at least one of the constituents in the case of combinations—impart to the printing ink the specific viscosity that is required for the printing process. In this connection, binding agents that have proved suitable are, in particular: cellulose esters such as nitrocellulose and cellulose butyrate; cellulose ethers such as methyl-, ethyl-, propyl-, isopropyl-, benzyl-, hydroxypropyl- or cyanoethylcellulose; polyvinylacetate; polyvinyl alcohol; zein (an albumin obtained from maize); melamine- and urea-formaldehyde condensation products; alcohol-soluble polyamides as well as, in particular, those having a polyacrylic base, by which are meant polyacrylic acid alkyl($C_1$–$C_3$)esters and methacrylic acid alkyl($C_1$–$C_3$)esters; also the alcohol-soluble and base-soluble acid modified colophonium, maleic, alkyd and phenol resins in combination with, e.g., triethanolamine, or ketone resins.

There is thus claimed in this connection also a printing ink having an organic-aqueous base, which printing ink contains, in addition to at least one binding agent, at least one organic solvent and, optionally, water, an aqueous preparation of transferable dyestuffs or optical brighteners that are insoluble to difficultly soluble in water and have a particle size of less than $10\mu$, especially less than $2\mu$, which preparation has a low content of dispersing agent and a high concentration of dyestuff or of optical brightener, with the said preparation containing at least 10 percent by weight of water, at least 30 percent by weight of a finely dispersed transferable dyestuff or optical brightener insoluble to difficultly soluble in water, and a mixture consisting of at most 10 percent by weight of an anion-active dispersing agent, at most 5 percent by weight of a nonionic dispersing agent, and at most 35 percent by weight of a hydrotropic agent, as well as, optionally, further additives.

The total water content of such an organic-aqueous printing ink is preferably between 5 and 50 percent by weight, particularly between 20 and 30 percent by weight. Particularly valuable printing inks are those which dry rapidly on the carrier, e.g. on paper. Preferred printing inks are ones which as preparations contain the following:

(a) 40 to 60 percent by weight of the dyestuff of the formula

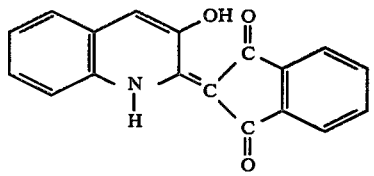

0.1 to 5 percent by weight of an anion-active condensation product of naphthalenesulphonic acid with formaldehyde (Na salt), 1 to 3 percent by weight of cetyl/stearyl alcohol etherified with 25 moles of ethylene oxide, 0.5 to 2 percent by weight of 35% aqueous formalin solution, 8 to 12 percent by weight of 1,2-propylene glycol, 5 to 20 percent by weight of urea, and 20 to 30 percent by weight of water;

(b) 40 to 60 percent by weight of the dyestuff of the formula

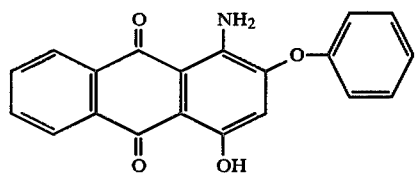

0.1 to 5 percent by weight of an anion-active condensation product of naphthalanesulphonic acid with formaldehyde (Na salt), 1 to 3 percent by weight of cetyl/stearyl alcohol etherified with 25 moles of ethylene oxide, 0.5 to 2 percent by weight of 35% aqueous formalin solution, 8 to 12 percent by weight of 1,2-propylene glycol, 5 to 20 percent by weight of urea, and 20 to 30 percent by weight of water;

(c) 35 to 65 percent by weight of the dyestuff of the formula

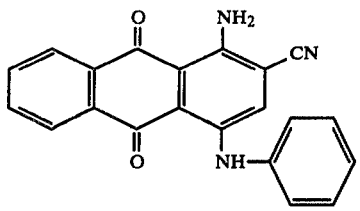

0.1 to 5 percent by weight of an anion-active condensation product of naphthalenesulphonic acid with formaldehyde (Na salt), 1 to 3 percent by weight of cetyl/stearyl alcohol etherified with 25 moles of ethylene oxide, 0.5 to 2 percent by weight of 35% aqueous formalin solution, 8 to 12 percent by weight of 1,2-propylene glycol, 5 to 20 percent by weight of urea, and more than 10 percent by weight of water;

(d) 40 to 60 percent by weight of the dyestuff of the formula

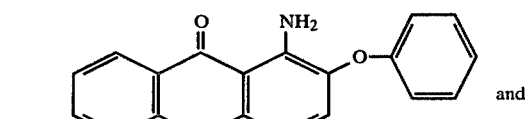

0.1 to 5 percent by weight of an anion-active condensation product of naphthalenesulphonic acid with formaldehyde (Na salt), 1 to 3 percent by weight of cetyl/stearyl alcohol etherified with 25 moles of ethylene oxide, 0.5 to 2 percent by weight of 35% aqueous formalin solution, 8 to 12 percent by weight of 1,2-propylene glycol, 5 to 20 percent by weight of urea, and 20 to 30 percent by weight of water;

(e) 40 to 60 percent by weight of a dyestuff mixture of the dyestuffs of the formulae

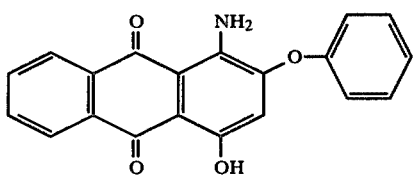

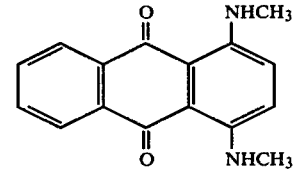

and 0.1 to 5 percent by weight of an anion-active condensation product of naphthalenesulphonic acid with formaldehyde (Na salt), 1 to 3 percent by weight of cetyl/stearyl alcohol etherified with 25 moles of ethylene oxide, 8 to 12 percent by weight of 1,2-propylene glycol, 0.5 to 2 percent by weight of 35% aqueous formalin solution, 5 to 20 percent by weight of urea, and 20 to 30 percent by weight of water;

(f) 40 to 60 percent by weight of the dyestuff of the formula

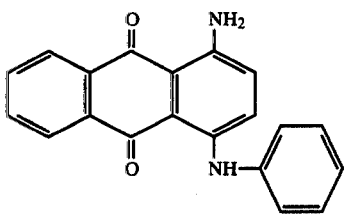

0.1 to 5 percent by weight of an anion-active condensation product of naphthalenesulphonic acid with formaldehyde (Na salt), 1 to 3 percent by weight of cetyl/stearyl alcohol etherified with 25 moles of ethylene oxide, 0.5 to 2 percent by weight of 35% aqueous formalin solution, 8 to 12 percent by weight of 1,2-propylene glycol, 5 to 20 percent by weight of urea, 0.2 percent by weight of an antifoaming agent, and 20 to 30 percent by weight of water; and (g) 35 to 65 percent by weight of the dyestuff of the formula

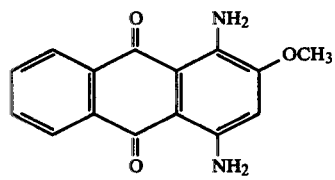

0.1 to 5 percent by weight of an anion-active condensation product of naphthalenesulphonic acid with formaldehyde (Na salt), 1 to 3 percent by weight of cetyl/stearyl alcohol etherified with 25 moles of ethylene oxide, 0.5 to 2 percent by weight of 35% aqueous formalin solution, 8 to 12 percent by weight of 1,2-propylene glycol, 5 to 20 percent by weight of urea, 0.1 percent by weight of an antifoaming agent, and more than 10 percent by weight of water.

The carrier materials that are to be printed with such organic-aqueous printing inks are known, and consist advantageously of a flexible sheet material that is preferably dimensionally stable, such as a strip, band or sheet, preferably having a smooth surface. These carrier materials must be stable to heat, and they are made of the most varied types of materials, particularly non-textile materials, such as metal, e.g. an aluminium or steel sheet; or they consist of a continuous strip of stainless steel, plastics, paper or Cellophane, preferably of a clean, non-lacquered cellulose parchment paper, which is optionally coated with a film of vinyl resin, ethylcellulose, polyurethane resin or Teflon.

The optionally filtered organic-aqueous printing inks are applied to the carrier material, in places or over the whole surface, by, for example, spraying, coating or, advantageously, printing. There can also be applied to the carrier material a multicoloured pattern, or the carrier material can be printed with a ground shade and thereafter successively with identical or different designs. After application of the printing ink to the carrier material, this is dried, e.g. with the aid of a warm flow of air or by infra-red irradiation.

The carrier materials can be printed also on both sides, and it is possible to select different colours and/or designs for the two sides. In order to avoid the use of a printing machine, the printing inks can be sprayed onto the carrier materials by means of, for example, a spray gun. Particularly interesting effects are obtained when simultaneously more than one shade is printed or sprayed on the carrier material. Specific designs can be obtained, e.g., by the use of stencils, or artistic designs can be applied by brush. If the carrier material is printed, then the most diverse printing processes may be employed, such as high-pressure processes (e.g. letterpress printing, flexographic printing), gravure printing (e.g. roller printing), screen printing (e.g. rotary printing or film printing) or electrostatic printing processes.

The transfer from the carrier material to the organic material to be printed is effected in the usual manner by the action of heat. For this purpose, the treated carrier materials are brought into contact with the materials to be printed, especially textile materials, and are held at about 120° to 210° C. until the dyestuffs or optical brighteners applied to the carrier material have been transferred to the textile material. As a rule, 5 to 60 seconds are sufficient to achieve this.

The action of heat can be applied by various known methods, for example by passage over a hot heating cylinder, by passage through a tunnel-shaped heating zone, or by means of a heated roller, advantageously together with a pressure-exerting, heated or unheated counter roller, or by means of a hot calender, or with the aid of a heated plate, optionally under vacuum, which devices are preheated to the required temperature by steam, oil, infra-red irradiation or microwaves, or which are located in a preheated heating chamber.

After completion of the heat treatment, the printed organic material is separated from the carrier material. This organic material requires no aftertreatment, neither a steam treatment to fix the dyestuff or optical brightener, nor a washing treatment to improve the fastness properties.

All synthetic fibres, provided that their thermal stability is adequate for the process, are in general suitable for printing in the transfer printing process. Suitable fibres in practice are polyester, polyacrylonitrile and polyamide fibres, cellulose-2½-fibres and cellulose triacetate fibres, as well as mixtures of these with each other, or admixtures of cellulose fibres or albumin fibres.

The following Examples illustrate the invention without the scope of the invention being limited by them. Except where otherwise stated, the term 'parts' denotes parts by weight. Temperature values are given in degrees Centigrade.

A. Production of the preparations

EXAMPLE 1

500 parts of the coarse crystalline dry dyestuff of the formula

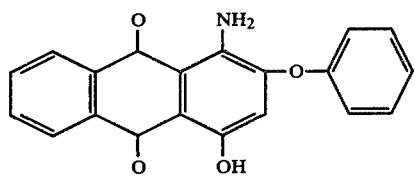

are slowly introduced, with intensive stirring (Dissolver or Lödige-Mischer (mixers)), into a pre-prepared solution of 25 parts of an anion-active dispersing agent (sodium salt of naphthalene sulphonic acid condensed with formaldehyde), 10 parts of a fatty alcohol polyglycol ether as nonionic dispersing agent (cetyl/stearyl alcohol etherified with 25 moles of ethylene oxide), 10 parts of a 35% aqueous formalin solution, 100 parts of 1,2-propylene glycol as antifrost agent and 118 parts of urea, as hydrotropic stabilising agent, in 147 parts of water, and the whole is homogenised for about 1 hour and then deaerated.

This 55% dyestuff mixture is then ground in a sand mill, or preferably in a closed ball mill (bead mill), by means of Ottawa sand and Siliquarzit balls (1 mm diameter), respectively, for about 10 hours at a temperature of 20° to 50°. After this time there is obtained a dispersion of which an overwhelming majority of particles are smaller than 5μ. The finely ground dispersion is subsequently diluted to give a dyestuff content of 50% (yield: 1000 parts) by the addition of a further 90 parts of water, which if necessary contains an amount (to be determined beforehand) of carboxymethylcellulose as thickening agent, in order to bring the final viscosity into the ideal range of 500 to 1000 cP (Brookfield viscosimeter; 30 r.p.m.).

The free-flowing aqueous preparation remains completely unchanged even throughout a storage time of several months, and withstands without impairment temperatures of −15° to +40°.

If, instead of the dyestuff, the anion-active dispersing agent, the nonionic dispersing agent and the hydrotropic agent given in the above example, there are used identical parts of the constituents shown in the following Table, with otherwise the same procedure, then likewise there are obtained storage-stable, free-flowing, aqueous dyestuff preparations having analogous properties, of which the dyestuff content and respective grinding time are governed by the dyestuff concerned, and are between 40 and 60 percent by weight and 5 to 10 hours, respectively.

Table

| Example No. | Dyestuff | anion-active dispersing agent | nonionic dispersing agent | hydrotropic agent |
|---|---|---|---|---|
| 2 | (anthraquinone with NH—CH$_3$ groups at 1,4 positions) | lignin sulphonate | fatty alcohol polyglycol ether (stearyl/oleyl alcohol etherified with 80 moles of ethylene oxide) | acetamide |
| 3 | (quinoline-OH fused with phthalide structure) | polyphosphate (Calgon$^R$) | phenol ether (p-nonylphenol etherified with 9 moles of ethylene oxide) | urea |
| 4 | (anthraquinone with NH$_2$, CN, NH—phenyl substituents) | condensation product from about 2 moles of naphthalenesulphonic acid and 1 mole of formaldehyde | mixture of 6 parts of ricinoleic acid ester with 15 moles of ethylene oxide with 1 part of fatty alcohol polyglycol ether (cetyl/stearyl alcohol etherified with 25 moles of ethylene oxide) | acetamide |
| 5 | (anthraquinone with NH$_2$, Cl, Cl, NH$_2$ substituents) | condensation product from naphthalenesulphonic acid formaldehyde and benzenesulphonic acid | fatty alcohol polyglycol ether (oleyl alcohol etherified with 20 moles of ethylene oxide) | acetamide |
| 6 | CH$_3$—C(=O)—HN—C$_6$H$_4$—N=N—C$_6$H$_3$(OH)(CH$_3$) | lignin sulphonate | hydroabietyl alcohol etherified with 25 moles of ethylene oxide | dimethyl-urea |

Table-continued

| Example No. | Dyestuff | anion-active dispersing agent | nonionic dispersing agent | hydrotropic agent |
|---|---|---|---|---|
| 7 | 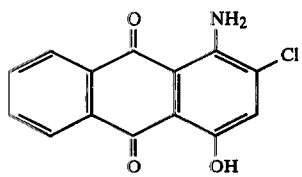 | mixture of 1 part of condensation product from crude cresol, formaldehyde and naphthalenesulphonic acid with 1 part of lignin sulphonate | fatty alcohol polyglycol ether (cetyl/stearyl alcohol etherified with 25 moles of ethylene oxide) | dimethylurea |
| 8 | 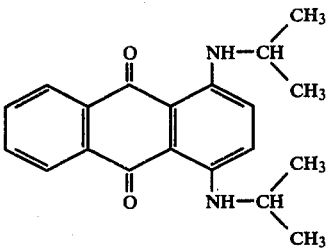 | condensation product from 2 moles of naphthalenesulphonic acid and 1 mole of formaldehyde (low salt content) | fatty alcohol polyglycol ether (cetyl/stearyl alcohol etherified with 25 moles of ethylene oxide) | urea |
| 9 | mixture of the dyestuffs (% = percent by weight) Ex. 1 38% Ex. 2 47.5% Ex. 3 14.5% | condensation product from about 2 moles of naphthalenesulphonic acid and 1 mole of formaldehyde | fatty alcohol polyglycol ether (cetyl/stearyl alcohol etherified with 25 mol of ethylene oxide) | urea |

EXAMPLE 10

500 parts of the dry dyestuff of the formula are slowly introduced, with vigorous stirring, into a solution of 30 parts of an anion-active dispersing agent (condensation product of about 2 moles of cresol, 0.2 mole of 2-naphthol-6-sulphonic acid and 3 moles of formaldehyde) and 110 parts of guanidine chloride (as hydrotropic agent) in 220 parts of water and 50 parts of monopropylene glycol, and the whole is homogenised for about 1 hour and deaearated. This 55% dyestuff mixture is then ground in an open mill by means of 2000 parts of Siliquarzit balls (1 mm diameter) for about 10 hours. After this time there is obtained a dispersion having a particle size smaller than 5μ. The ground material is diluted to 1000 parts by the addition of a further 60 parts of monopropylene glycol, 10 parts of 35% aqueous Formalin solution as well as 20 parts of a fatty alcohol polyglycol ether as nonionic dispersing agent (cetyl/stearyl alcohol etherified with 25 moles of ethylene oxide), and the whole is homogenised for 15 minutes. There is also added if necessary an antifoaming agent. The grinding agent is then removed to leave a free-flowing aqueous preparation having a dyestuff content of about 50 percent by weight. This preparation has a low viscosity (500 cP/20° C.) and remains unchanged throughout a storage time of several weeks.

EXAMPLE 11

500 parts of the dry dyestuff of the formula are slowly introduced, with vigourous stirring, into a solution of 30 parts of an anion-active dispersing agent (poly-2-naphthylmethanesulphonic acid) and 110 parts of N-methylacetamide (as hydrotropic agent) in 220 parts of water and 50 parts of monopropylene glycol, and the whole is homogenised for about 1 hour and deaerated. This 55% dyestuff mixture is then ground in an open mill by means of 2000 parts of Siliquarzit balls (1 mm diameter) for about 3 hours. After this time there is obtained a dispersion having a particle size smaller than 5μ. The ground material is diluted to 1000 parts by the addition of a further 60 parts of monopropylene gycol, 10 parts of 35% aqueous Formalin solution and 20 parts of a fatty alcohol polyglycol ether as nonionic dispersing agent (cetyl/stearyl alcohol etherified with 25 moles of ethylene oxide), and the whole is homogenised for 15 minutes. There is also added if necessary an antifoaming agent. The grinding agent is then removed to leave a free-flowing aqueous preparation having a dyestuff content of about 50 percent by weight. This preparation has a low viscosity (500 cP/20°) and remains unchanged during a storage time of several weeks.

EXAMPLE 12

500 parts of the pure dry active substance of the optical brightener of the formula

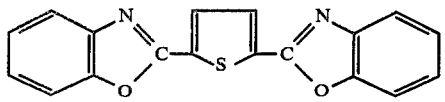

are slowly introduced, with vigorous stirring, into a solution of 17 parts of an anion-active dispersing agent (formaldehyde condensed with sodium naphthalene sulphonate) and 125 parts of urea (as hydrotropic agent) in 230 parts of water and 50 parts of monopropylene glycol, and the whole is homogenised for about 1 hour and deaerated. This approx. 53% mixture is then ground in a closed stirrer-ball mill (DYNO mill, type KDL) by means of Siliquarzit balls (1 mm diameter) for about 4 hours. After this time there is obtained a dispersion having a particle size smaller than 3 microns. The ground material is diluted to 1000 parts by the addition of a further 50 parts of monopropylene glycol, 10 parts of 35% Formalin solution as well as 18 parts of a fatty alcohol polyglycol ether as nonionic dispersing agent (cetyl/stearyl alcohol etherified with 25 moles of ethylene oxide), and the whole is homogenised for 15 minutes. There is also added if necessary a defoaming agent. The grinding agent is then removed to leave a free-flowing aqueous preparation having a content of active substance of about 50 parts by weight. The preparation has a low viscosity (<100 cP/20° C.).

EXAMPLE 13

If there are used in Example 12, instead of the given optical brightener, identical amounts of an optical brightener of the formula

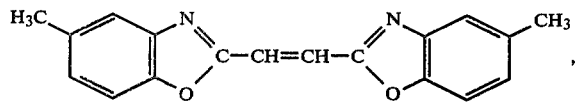

instead of the anion-active dispersing agent, identical amounts of a sulphonated sulphone mixture of phenol and naphthalene, partially condensed with formaldehyde, and instead of the nonionic dispersing agent, identical amounts of stearyl/oleyl alcohol etherified with 80 moles of ethylene oxide, with otherwise the same procedure, then there is obtained a preparation of an optical brightener.

EXAMPLE 14

480 parts of the coarse crystalline dry dyestuff of the formula

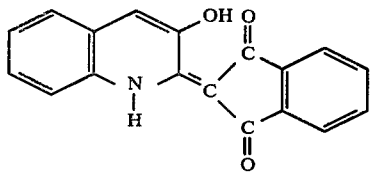

are slowly introduced with intensive stirring [Dissolver or Lödige-Mischer (mixers)] into a pre-prepared solution of 24 parts of an anion-active dispersing agent (sodium naphthalene sulphonate condensed with formaldehyde), 10 parts of a fatty alcohol polyglycol ether as a nonionic dispersing agent (cetyl/stearyl alcohol etherified with 25 moles of ethylene oxide), 10 parts of 35% aqueous formalin solution, 100 parts of 1,2-propylene glycol as an antifrost agent and 124 parts of urea, as a hydrotropic stabilising agent, in 172 parts of water, and the whole is homogenised for about 1 hour and deaerated.

The approx. 52% dyestuff mixture is then ground in a sand mill, or preferably in a closed ball mill, by means of Ottawa sand and Siliquarzit balls (1 mm diameter), respectively, for about 10 hours at a temperature of 20° to 50°. After this time there is obtained a dispersion of which the overwhelming majority of particles are smaller than 5μ. The finely ground dispersion is subsequently diluted to give a dyestuff content of 48% (yield: 1000 parts) by the addition of a further 80 parts of water which, if necessary, contains an amount (to be determined beforehand) of carboxymethylcellulose as a thickening agent, in order to bring the final viscosity into the ideal range of 500 to 1000 cP (Brookfield viscosimeter; 30 r.p.m.). The free-flowing aqueous preparation remains completely unchanged even after a storage time of several months, and withstands without impairment temperatures of −15° to +40°.

EXAMPLE 15

320 parts of the coarse crystalline dry dyestuff mixture of the formulae

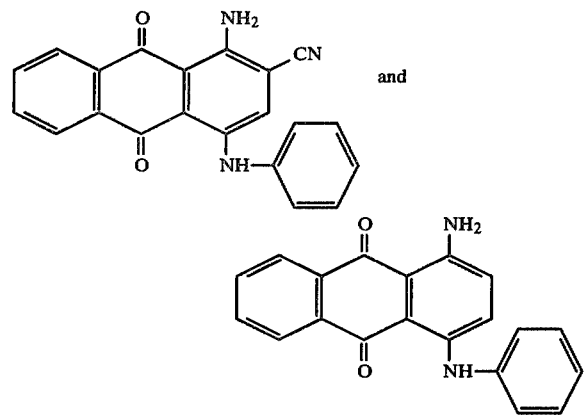

are slowly introduced, with intensive stirring (Dissolver or Lödige-Mischer [mixers]), into a pre-prepared solution of 5 parts of an anion-active dispersing agent (sodium naphthalene sulphonate condensed with formaldehyde), 20 parts of a fatty alcohol polyglycol ether as a nonionic dispersing agent (cetyl/stearyl alcohol etherified with 25 moles of ethylene oxide), 10 parts of 35% aqueous formalin solution, 150 parts of 1,2-propylene glycol as an antifrost agent and 130 parts of urea, as a hydrotropic stabilising agent, in 190 parts of water, and the whole is then homogenised for about 1 hour and deaerated.

This dyestuff mixture is subsequently ground in a sand mill, or preferably in a closed ball mill, by means of Ottawa sand and Siliquarzit balls (1 mm diameter), respectively, for about 10 hours at a temperature of 20° to 50°. After this time there is obtained a dispersion of which an overwhelming majority of particles are smaller than 5μ. The finely ground dispersion is diluted to give a final dyestuff content of 40% (=1000 parts) by the addition of a further 175 parts of water containing if necessary an amount (to be determined beforehand) of carboxymethylcellulose as a thickening agent, in order to bring the final viscosity into the ideal range of 500 to 1000 cP (Brookfield viscosimeter; 30 r.p.m.). The free-flowing aqueous preparation remains completely unchanged even after a storage time of several months, and withstands without impairment temperatures of −15° to +40°.

EXAMPLE 16

500 parts of the coarse crystalline dry dyestuff of the formula

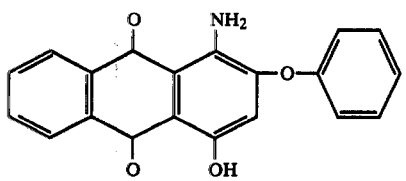

are slowly introduced, with intensive stirring (Dissolver or Lödige-Mischer (mixers)), into a pre-prepared solution of 25 parts of an anion-active dispersing agent (sodium salt of naphthalene sulphonic acid condensed with formaldehyde), 10 parts of a fatty alcohol polyglycol ether as nonionic dispersing agent (cetyl/stearyl alcohol etherified with 25 moles of ethylene oxide), 10 parts of a 35% aqueous Formalin solution, 100 parts of a 1,2-propylene glycol as antifrost agent and 118 parts of urea, as hydrotropic stabilising agent, in 147 parts of water, and the whole is then homogenised for about 1 hour and subsequently deaerated.

This 55% dyestuff mixture is afterwards ground in a sand mill, or preferably in a closed ball mill (bead mill), by means of Ottawa sand and Siliquarzit balls (1 mm diameter), respectively, for about 5 hours at a temperature of 20° to 50°. After this time there is obtained a dispersion of which an overwhelming majority of particles are smaller than 5μ. The finely ground dispersion is subsequently diluted to give a dyestuff content of 50% (yield: 1000 parts) by the addition of a further 90 parts of water, which if necessary contains an amount (to be determined beforehand) of carboxymethylcellulose as thickening agent, in order to bring the final viscosity into the ideal range of 500 to 1000 cP (Brookfield viscosimeter; 30 r.p.m.).

This free-flowing aqueous preparation remains completely unchanged even throughout a storage time of several months, and withstands without impairment temperatures of −15° to +40°.

EXAMPLE 17

400 parts of the coarse crystalline dry dyestuff of the formula

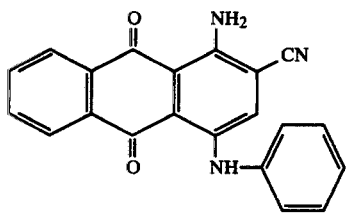

are slowly introduced, with intensive stirring (Dissolver or Lödige-Mischer [mixers]), into a pre-prepared solution of 20 parts of an anion-active dispersing agent (sodium naphthalene sulphonate condensed with formaldehyde), 20 parts of a fatty alcohol polyglycol ether as a nonionic dispersing agent (cetyl/stearyl alcohol etherified with 25 moles of ethylene oxide), 10 parts of 35% aqueous Formalin solution, 100 parts of 1,2-propylene glycol as an antifrost agent and 150 parts of urea, as a hydrotropic stabilising agent, in 190 parts of water, and the whole is then homogenised for about 1 hour and deaerated.

This 45% dyestuff mixture is subsequently ground in a sand mill, or preferably in a closed ball mill, by means of Ottawa sand and Siliquarzit balls (1 mm diameter), respectively, for about 10 hours at a temperature of 20° to 50°. After this time there is obtained a dispersion of which an overwhelming majority of particles are smaller than 5μ. The finely ground dispersion is diluted to give a final dyestuff content of 40% (=1000 parts) by the addition of a further 110 parts of water containing if necessary an amount (to be determined beforehand) of carboxymethylcellulose as a thickening agent, in order to bring the final viscosity into the ideal range of 500 to 1000 cP (Brookfield viscosimeter; 30 r.p.m.). The free-flowing aqueous preparation remains completely unchanged even after a storage time of several months, and withstands without impairment temperatures of −15° to +40°.

EXAMPLE 18

482 parts of the coarse crystalline dry dyestuff of the formula

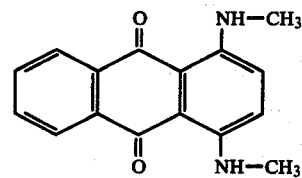

are slowly introduced, with vigorous stirring (Dissolver of Lödige-Mischer [mixers]), into a pre-prepared solution of 20 parts of an anion-active dispersing agent (sodium naphthalene sulphonate condensed with formaldehyde), 15 parts of a fatty alcohol polyglycol ether as a nonionic dispersing agent (cetyl/stearyl alcohol etherified with 25 moles of ethylene oxide), 10 parts of 35% aqueous formalin solution, 100 parts of 1,2-propylene glycol as an antifrost agent and 120 parts of urea, as a hydrotropic stabilising agent, in 145 parts of water, and the whole is then homogenised for about 1 hour and deaerated.

This 54% dyestuff mixture is then ground in a sand mill, or preferably in a closed ball mill, by means of Ottawa sand and Siliquarzit balls (1 mm diameter), respectively, for about 10 hours at a temperature of 20°to 50°. After this time there is obtained a dispersion of which the overwhelming majority of particles are smaller than 5μ. The finely ground dispersion is diluted to give the final dyestuff content of 48.2% by the addition of a further 108 parts of water containing if necessary an amount (to be determined beforehand) of carboxymethyl cellulose as a thickening agent, in order to thus bring the final viscosity into the ideal range of 500 to 1000 cP (Brookfield viscosimeter; 30 r.p.m.). The free-flowing aqueous preparation remains completely unchanged even after a storage time of several months, and withstands without impairment temperatures of −15° to +40°.

EXAMPLE 19

445 parts of the coarse crystalline dry dyestuff of the formula

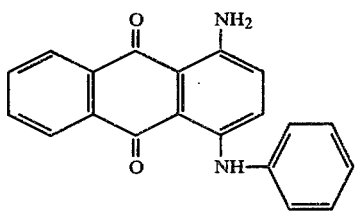

are slowly introduced, with thorough stirring (Dissolver or Lödige-Mischer [mixers]), into a pre-prepared solution of 10 parts of an anion-active dispersing agent (sodium naphthalene sulphonate condensed with formaldehyde), 20 parts of a fatty alcohol polyglycol ether as a nonionic dispersing agent (cetyl/stearyl alcohol etherified with 25 moles of ethylene oxide), 10 parts of 35% aqueous formalin solution, 100 parts of 1,2-propylene glycol as an antifrost agent and 137 parts of urea as a hydrotropic stabilising agent in 205 parts of water, and the whole is then homogenised for about 1 hour and deaerated.

This 48% dyestuff mixture is then ground in a sand mill, or preferably in a closed ball mill, by means of Ottawa sand or Siliquarzit balls (1 mm diameter) for about 10 hours at a temperature of 20° to 50°. There is obtained after this time a dispersion of which an overwheming majority of particles are smaller than 5μ. The finely ground dispersion is diluted to give a final dyestuff content of 44.5% (=1000 parts) by the addition of a further 73 parts of water containing if necessary an amount (to be determined beforehand) of carboxymethylcellulose as a thickening agent, in order to thus bring the final viscosity into the ideal range of 500 to 1000 cP (Brookfield viscosimeter; 30 r.p.m.). The free-flowing aqueous preparation remains completely unchanged even after a storage time of several months, and withstands without impairment temperatures of −15° to +40°.

EXAMPLE 20

415 parts of the coarse crystalline dry dyestuff of the formula

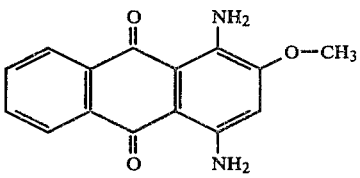

are slowly introducted, with thorough stirring (Dissolver or Lödige-Mischer [mixers]), into a pre-prepared solution of 5 parts of an anion-active dispersing agent (sodium naphthalene sulphonate condensed with formaldehyde), 20 parts of a fatty alcohol polyglycol ether as a nonionic dispersing agent (cetyl/stearyl alcohol etherified with 25 moles of ethylene oxide), 10 parts of 35% aqueous formalin solution, 100 parts of 1,2-propylene glycol as an antifrost agent and 150 parts of urea as a hydrotropic stabilising agent in 222 parts of water, and the whole is homogenised for about 1 hour and deaerated.

This 45% dyestuff mixture is subsequently ground in a sand mill, or preferably in a closed ball mill, by means of Ottawa sand and Siliquarzit balls (1 mm diameter), respectively, for about 10 hours at a temperature of 20° to 50°. There is obtained after this time a dispersion of which an overwhelming majority of particles are smaller than 5μ. The finely ground dispersion is diluted to give a final dyestuff content of 41.5% (=1000 parts) by the addition of a further 78 parts of water containing if necessary an amount (to be determined beforehand) of carboxymethylcellulose as a thickening agent, in order to thus bring the final viscosity into the ideal range of 500 to 1000 cP (Brookfield viscosimeter; 30 r.p.m.). The free flowing aqueous preparation remains completely unchanged even after a storage time of several months, and withstands without impairment temperatures of −15° to +40°.

B. Production of the organic-aqueous printing ink and the use thereof

EXAMPLE 21

10 parts of a preparation according to Examples 1 to 20 are stirred within 5 minutes, by means of a high-speed stirrer (Homorex), into 90 parts of a solution consisting of 2.5 parts of ethylhydroxyethylcellulose (EHEC/Hercules) and 11 parts of polyvinyl acetate (Mowilith 20) in 62 parts of ethanol, 12 parts of methyl ethyl ketone and 2.5 parts of nitromethane, and the whole is very vigorously stirred for a further 5 minutes. There is formed an organic-aqueous printing ink having a viscosity of about 20 seconds (Ford viscosimeter 4), corresponding to 70 to 80 cP/20°, which contains the dyestuff or optical brightener suspended in a loose flocculated form, and which is excellently suitable for the printing of paper by the gravure printing process. The dyestuff or optical brightener printed onto the paper can then be transferred, in a thermal reprinting operation, at a temperature of about 200° to 210° to a synthetic material, such as polyester fabric.

EXAMPLE 22

8 parts of a preparation produced according to the Examples 1 to 20 are diluted with 10 parts of water; into this diluted preparation there are then dispersed, with stirring, 5 parts of zein (albumin obtained from maize) until no lumps remain. As a result of the stirring-in of 77 parts of ethanol there is then obtained, after 10 minutes' vigorous stirring, a very low-viscous (viscosity 12 seconds/Ford viscosimeter 4 or 18 cP/20°), completely deflocculated printing ink, which is suitable for the printing of paper by the gravure printing process. The paper printed in this manner is suitable for the transfer printing process on polyester and on other synthetic fibres.

If there are used, instead of 10 parts of water, 10 parts of a 10% methylcellulose solution in water, then there is obtained a correspondingly higher-viscous printing ink (20 seconds/Ford viscosimeter 4).

EXAMPLE 23

By the stirring in each case of 7.5 parts of the preparations produced according to the Examples 1 to 20 and 7.5 parts of water into a solution of 3 parts of a melamine-formaldehyde condensation product and 8.5 parts of alcohol-soluble cellulose butyrate in 73.5 parts of 96% denatured alcohol by means of an Ultra-Turrax stirrer there is obtained, after 5 minutes, a completely disaggregated dispersion having a viscosity of 30 seconds/Ford viscosimeter 4, which printing ink is very suitable for flexographic printing on paper, with a printed paper being obtained which can be used on synthetic textile materials in the transfer printing process.

EXAMPLE 24

8 parts of a preparation obtained according to the Examples 1 to 20 combined with 5 parts of ethylene glycol are dispersed by means of a Homorex stirrer, within 10 minutes, in a solution of 7.5 parts of ethylcellulose in 79.5 parts of ethanol. There is obtained an organic-aqueous printing ink having a viscosity of 25 seconds/Ford viscosimeter 4, corresponding to about 90 cP/20°, which printing ink is suitable for the printing of paper in the gravure printing process. The paper printed in this manner can be used for polyester materials in the transfer printing process.

EXAMPLE 25

20 parts of a preparation obtained according to the Examples 1 to 20, stirred together with 0.2 part of a modified polyvinylpyrrolidone (Antaron P904), are dispersed by means of an Ultra Turax stirrer, within 4 minutes, in a solution of 8 parts of ethylcellulose in 72 parts of ethanol. There is obtained a printing ink having a viscosity of 80 seconds/Ford viscosimeter 4, corresponding to 680 cP/20°, which printing ink is suitable for the printing of paper in the flexographic printing process. The paper printed in this manner can be used in the transfer printing process for polyamide, polyacrylonitrile or cellulose triacetate materials.

EXAMPLE 26

8 parts of a preparation produced according to the Examples 1 to 20, mixed with 2 parts of water, are preliminarily dissolved within 5 minutes, by means of a high-speed stirrer, in 4 parts of ethylhydroxyethylcellulose (EHEC) and 8 parts of an alcohol-soluble polyamide (Scope 30), and the whole is dispersed in 78 parts of a solvent mixture consisting of 60 parts of ethanol and 18 parts of Isopar E (Esso=aliphatic solvent). There is obtained a printing ink having a viscosity of 38 seconds/Ford viscosimeter 4, which printing ink is printable in the gravure printing process on paper which can then be used in the transfer reprinting process, wherein, e.g. the printed paper is placed against a piece of tufted carpet made from polyester fibres for 30 seconds under a press heated to 210°, and the paper is subsequently removed. There is obtained on the carpet by this process an extremely clear full printing.

EXAMPLE 27

20 parts of a preparation produced according to the Examples 1 to 20 are homogenised with 15 parts of a solution consisting of 3 parts of oxypropylcellulose, 10 parts of water and 2 parts of triethanolamine, and the whole is introduced, with vigorous stirring, into 85 parts of a 15% solution of a maleic resin (Alresat KM 400, Reichhold Chemie) in isopropanol. There is obtained a printing ink having a viscosity of 34 seconds/Ford viscosimeter 4, which printing ink is suitable for flexographic printing on paper. The paper printed in this manner is suitable for thermal reprinting on polyester and on other fibres.

EXAMPLE 28

3 parts of the formulation according to Example 14 are mixed with 13.5 parts of water, and the mixture is well homogenised, by means of a stirrer, in 83.5 parts of a solution containing 62.8 parts of 96% ethanol, 15.5 parts of water and 5.2 parts of hydroxypropylcellulose. There is obtained a printing ink having a viscosity of 21 seconds/Ford viscosimeter 4, which printing ink is suitable for the printing of paper, which can be used for transfer printing on synthetic textile materials.

EXAMPLE 29

8 parts of the dyestuff preparation obtained according to Example 15 are mixed with 13.5 parts of water, and the mixture is well homogenised, by means of a stirrer, in 78.5 parts of a solution containing 59.5 parts of 96% ethanol, 14 parts of water and 5 parts of hydroxypropylcellulose. There is obtained a printing ink having a viscosity of 21 seconds/Ford viscosimeter 4, which printing ink is printable in the gravure printing process on paper, which can then be used in the transfer reprinting process wherein the printed paper for example is placed against a piece of polyester satin fabric for 30 seconds in a press heated to 210°, and the paper is subsequently removed. There is obtained by this process a clear and strong printing.

EXAMPLE 30

6 parts of the aqueous dyestuff preparation according to Example 16 are mixed with 13.5 parts of water, and the mixture is well homogenised, by means of a stirrer, in 80.5 parts of a solution containing 61.5 parts of isopropanol, 15 parts of water and 4 parts of hydroxypropylcellulose. There is obtained a printing ink having a viscosity of 22 seconds/Ford viscosimeter 4, which printing ink is suitable for the printing of paper in the gravure printing process. The paper printed in this manner can be used in the transfer printing process for polyester materials.

EXAMPLE 31

6 parts of the aqueous dyestuff preparation according to Example 16 are mixed with 18.5 parts of water; and 69.5 parts of isopropanol are added with stirring. There are then slowly added to the resulting dyestuff suspension 6 parts of hydroxypropylcellulose. Stirring is subsequently continued for 45 minutes and filtration is then performed. There is obtained a printing ink having a viscosity of 36 seconds/Ford viscosimeter 4, which printing ink is suitable for the printing of paper in the gravure printing process, which can then be used on synthetic textile materials in the transfer printing process.

EXAMPLE 32

6 parts of the aqueous dyestuff preparation according to Example 16 are mixed with 38.5 parts of water; and 43.5 parts of isopropanol are added with thorough stirring. There are then slowly added to the resulting dyestuff suspension 6 parts of hydroxypropylcellulose. The whole is subsequently well stirred for 60 minutes and afterwards filtered. There is obtained a printing ink having a viscosity of 40 seconds/Ford viscosimeter 4, which printing ink is printable on paper in the gravure printing process. The printed paper can then be used on synthetic textile materials in the transfer printing process.

EXAMPLE 33

3 parts of a dyestuff preparation according to Example 14 are mixed with 13.5 parts of water and well homogenised, by means of a stirrer, in 83.5 parts of a solution containing 30 parts of Collacurl VL (=30% aqueous solution of a copolymer based on vinylpyrrolidone), 4.25 parts of water and 49.25 parts of isopropanol. There is obtained a printing ink having a viscosity of 25 seconds/Ford viscosimeter 4, which is suitable for printing on paper.

EXAMPLE 34

3 parts of a dyestuff preparation according to Example 14 are well mixed with 7 parts of water and thoroughly homogenised, by means of a stirrer, in 90 parts of a solution containing 3 parts of hydroxypropylcellulose, 9 parts of Primal WS-24 (=36% aqueous preparation of an acrylic copolymer resin), 13.75 parts of water and 64.25 parts of isopropanol. There results a printing ink having a viscosity of 20 seconds/Ford viscosimeter 4, which is suitable for printing on paper.

We claim:

1. In a printing ink composition having an organic-aqueous base and comprising:
   A. 4 to 13.5 percent by weight of at least one binding agent,
   B. 43.5 to 84.5 percent by weight of at least one organic solvent,
   C. up to 50 percent by weight water, and
   D. 3 to 20 percent by weight of an aqueous preparation of transferable dyestuffs or optical brighteners,
   the improvement according to which the aqueous preparation comprises
   (1) at least 10% by weight water,
   (2) at least 30% by weight of finely dispersed transferable dyestuff or optical brightener, said dyestuffs and brighteners being selected from among those which (a) have a particle size of less than 10μ, (b) are insoluble to difficultly soluble in water and (c) are suitable for use in the transfer printing process, and
   (3) a mixture containing as essential components
      (a) 0.1 to 10 percent by weight of an anion-active dispersing agent,
      (b) 1 to 5 percent by weight of a non-ionic dispersing agent, and
      (c) 5 to 35 percent by weight of a hydrotropic agent.

2. A printing ink composition as claimed in claim 1, wherein the said mixture (3) further contains at least one additional additive.

3. A printing ink composition according to claim 1, wherein the organic solvent is selected from aliphatic alcohols, a mixture of aliphatic alcohols, a mixture of aliphatic alcohol with benzine having a boiling range of 110° to 180° C. and a mixture of aliphatic alcohol with an aliphatic ketone.

4. A printing ink composition according to claim 1, wherein the binding agent contained therein is soluble in the printing ink.

5. A printing ink composition according to claim 4, wherein the binding agent is selected from cellulose esters, cellulose ethers, polyacrylic acid alkyl ($C_1$–$C_3$) esters, polymethacrylic acid alkyl ($C_1$–$C_3$) esters, alcohol-soluble or base-soluble acid modified colophonium, maleic, aldehyde and phenol resins in combination with triethanolamine or ketone resins.

6. A printing ink composition according to claim 1, containing a total of 5 to 50 percent by weight of water.

7. A printing ink composition according to claim 1 wherein the aqueous preparation is of the following composition:
   40 to 60 percent by weight of the dyestuff of the formula

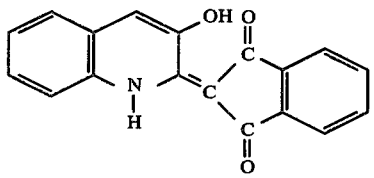

0.1 to 5 percent by weight of the sodium salt of a condensation product of naphthalenesulphonic acid with formaldehyde,
   1 to 3 percent by weight of one mole of a mixture of cetyl and stearyl alcohol, etherified with 25 moles of ethylene oxide,
   0.5 to 2 percent by weight of 35% aqueous Formalin solution,
   8 to 12 percent by weight of 1,2-propylene glycol,
   5 to 20 percent by weight of urea, and
   20 to 30 percent by weight of water.

8. A printing ink composition according to claim 1, wherein the aqueous preparation is of the following composition:
   40 to 60 percent by weight of the dyestuff of the formula:

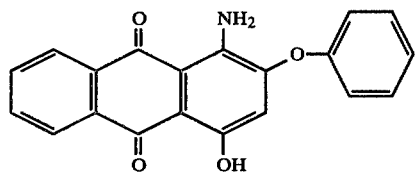

0.1 to 5 percent by weight of the sodium salt of a condensation product of naphthalenesulphonic acid with formaldehyde,
   1 to 3 percent by weight of one mole of a mixture of cetyl and stearyl alcohol etherified with 25 moles of ethylene oxide,
   0.5 to 2 percent by weight of 35% aqueous Formalin solution,
   8 to 12 percent by weight of 1,2-propylene glycol,
   5 to 20 percent by weight of urea, and
   20 to 30 percent by weight of water.

9. A printing ink composition according to claim 1 wherein the aqueous preparation is of the following composition:
   35 to 65 percent by weight of the dyestuff of the formula

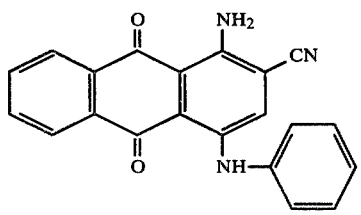

0.1 to 5 percent by weight of the sodium salt of a condensation product of naphthalenesulphonic acid with formaldehyde,
1 to 3 percent by weight of one mole of a mixture of cetyl and stearyl alcohol etherified with 25 moles of ethylene oxide,
0.5 to 2 percent by weight of 35% aqueous Formalin solution,
8 to 12 percent by weight of 1,2-propylene glycol,
5 to 20 percent by weight of urea, and more than 10 percent by weight of water.

10. A printing ink composition according to claim 1, wherein the aqueous preparation is of the following composition:
40 to 60 percent by weight of the dyestuff of the formula:

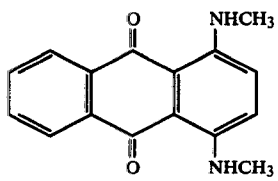

0.1 to 5 percent by weight of the sodium salt of a condensation product of naphthalenesulphonic acid with formaldehyde,
1 to 3 percent by weight of one mole of a mixture of cetyl and stearyl alcohol etherified with 25 moles of ethylene oxide,
0.5 to 2 percent by weight of 35% aqueous Formalin solution,
8 to 12 percent by weight of 1,2-propylene glycol,
5 to 20 percent by weight of urea, and
20 to 30 percent by weight of water.

11. A printing ink composition according to claim 1, wherein the aqueous preparation is of the following composition:
40 to 60 percent by weight of a dyestuff mixture of the dyestuffs of the formulae

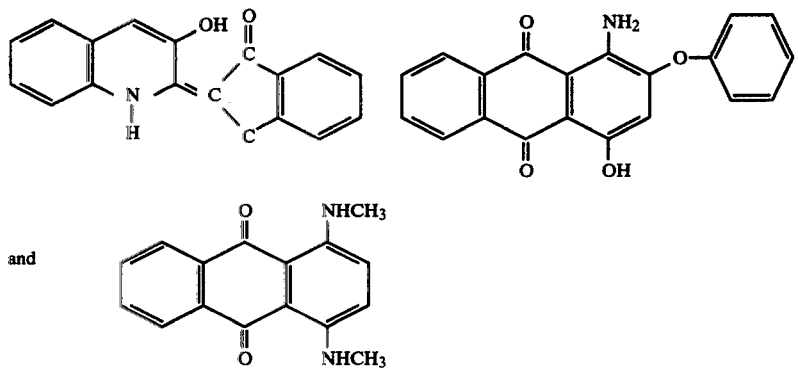

0.1 to 5 percent by weight of the sodium salt of a condensation product of naphthalenesulphonic acid with formaldehyde,
1 to 3 percent by weight of one mole of a mixture of cetyl and stearyl alcohol etherified with 25 moles of ethylene oxide,
8 to 12 percent by weight of 1,2-propylene glycol,
0.5 to 2 percent by weight of 35% aqueous Formalin solution,
5 to 20 percent by weight of urea, and
20 to 30 percent by weight of water.

12. A printing ink composition according to claim 1, wherein the aqueous preparation is of the following composition:
40 to 60 percent by weight of the dyestuff of the formula:

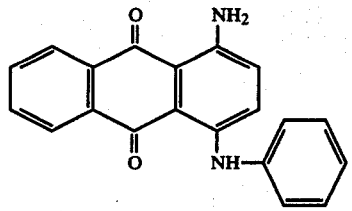

0.1 to 5 percent by weight of the sodium salt of a condensation product of naphthalenesulphonic acid with formaldehyde,
1 to 3 percent by weight of one mole of a mixture of cetyl and stearyl alcohol etherified with 25 moles of ethylene oxide,
0.5 to 2 percent by weight of 35% aqueous Formalin solution,
8 to 12 percent by weight of 1,2-propylene glycol,
5 to 20 percent by weight of urea,
0.2 percent by weight of an antifoaming agent, and
20 to 30 percent by weight of water.

13. A printing ink composition according to claim 1, wherein the aqueous preparation is of the following composition:

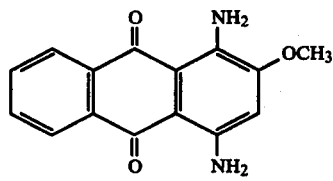

0.1 to 5 percent by weight of the sodium salt of a condensation product of naphthalenesulphonic acid with formaldehyde,
1 to 3 percent by weight of one mole of a mixture of cetyl and stearyl alcohol etherified with 25 moles of ethylene oxide,
0.5 to 2 percent by weight of 35% Formalin solution,
8 to 12 percent by weight of 1,2-propylene glycol,
5 to 20 percent by weight of urea,
0.1 percent by weight of an antifoaming agent, and more than
10 percent by weight of water.

* * * * *